United States Patent
Ripple et al.

(10) Patent No.: US 6,425,970 B1
(45) Date of Patent: Jul. 30, 2002

(54) METHOD FOR GROUNDING EBP PROCESSING

(75) Inventors: Warren Paul Ripple, North Canton; Brian Richard Koch, Hartville, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/467,691

(22) Filed: Dec. 21, 1999

(51) Int. Cl.⁷ .............................. B32B 29/02; B32B 5/00
(52) U.S. Cl. ...................... 156/178; 156/179; 156/181; 156/273.5; 156/274.6; 156/275.5; 156/437; 264/175; 29/728; 29/820; 29/DIG. 32; 29/527.2
(58) Field of Search ........................... 29/728, 820, 819, 29/DIG. 32, 825, 527.2; 264/175, 171.15, 171.16; 156/178, 179, 181, 272.2, 273.5, 275.5, 274.6, 437

(56) References Cited

U.S. PATENT DOCUMENTS

| | | | | |
|---|---|---|---|---|
| 3,926,132 A | * | 12/1975 | Lear et al. ................ | 112/80.73 |
| 5,000,807 A | * | 3/1991 | Stuart .......................... | 156/166 |
| 5,190,774 A | * | 3/1993 | Koichi et al. ................ | 425/363 |
| 6,295,931 B1 | * | 10/2001 | Cutler et al. ................. | 102/221 |

* cited by examiner

Primary Examiner—Rick K. Chang
(74) Attorney, Agent, or Firm—David E Wheeler

(57) ABSTRACT

A method for grounding reinforcement (12) and composites (17) on a calender line reduces static build up on the composite (17), and makes it possible to subject a wire reinforced composite to electron beam processing (EBP). The method employs a slip ring (36) attached to rolls which contact composite (17) on the calender (11), and reinforcement (12) before it reaches the calender (11), wherein the slip ring (36) rotates with the rolls while the rolls are working polymer into the reinforcement, and a terminal (34) connected to the slip ring (36) remains stationary, and the terminal (34) is attached to ground (27). The method effectively grounds the composite as well as the reinforcement to prevent electrical discharge during EBP.

6 Claims, 3 Drawing Sheets

METHOD FOR GROUNDING EBP PROCESSING

TECHNICAL FIELD

The invention relates to apparatus and a method of processing elastomeric materials. In particular, the process is directed to a means of producing carbon carbon bonds in a vulcanizable elastomer, and in particular, an elastomer that contains wire reinforcement.

BACKGROUND OF THE INVENTION

Electron beam processing (EBP) is known in the art for treating elastomeric materials to enhance their green strength. EBP activates carbon atoms in a polymer and induces carbon carbon crosslinking. Carbon carbon cross linking in a green elastomer gives the elastomer added strength that makes it possible in some cases, and easier in other cases, to handle the green elastomer during processing before vulcanization.

Electron beam processing is known to induce an electromotive force in wire cords, along with a potentially high voltage, and for such reasons electron beam processing of wire reinforced elastomers has been generally avoided in the past.

In prior attempts to provide a means for using EBP on wire reinforced elastomers, a shunt was connected across the wire cords at the beginning of each windup roll. The shunt was then connected to plant ground potential at the windup.

On all fabric and wire calender lines, static build-up was removed with wire brushes, which require frequent replacement because of fast wear and lost contact with the sheet product.

Previous experiments have shown that the electric potential in a wire-reinforced elastomer that is subjected to EBP can be as high as 2,500 volts, with a very small current (in the milliamp (MA) range). This induced potential can damage an elastomer by arcing from wire to wire in the elastomer, thereby burning the rubber and also causing a safety hazard to the machine operator.

It is an object of this invention to provide an apparatus and method, which makes it possible to treat a wire, reinforced elastomer with electron beam processing.

It has been found, using the method of this invention, that static build-up that normally occurs when calendering elastomeric products can also be substantially eliminated.

Other objects of the invention will be apparent from the following description and claims.

SUMMARY OF INVENTION

A method of forming a reinforced composite 17 on a calender 11 comprises the steps of a) grounding guide rolls 19 that contact reinforcement 12 from a creel 18 prior to feeding the reinforcement 12 to a calender 11, b) coating the reinforcement 12 with rubber 23 while on the calender 11 to form a reinforced composite 17, and c) grounding rolls which contact the reinforced composite as the composite exits the calender 11.

The method in steps (a) and (c) may further comprise the steps of I) attaching slip rings 36 to rolls 14,15,19,21 which contact the reinforcement 12 and the composite 17 on the calender 11, and II) connecting the slip rings 36 to ground 27.

The method in step (a), comprising grounding reinforcement 12 from a creel 18, may further comprise the further steps of I) drilling and tapping the end of a roller shaft 32a to provide a threaded hole 37 for receipt of a bolt 39, II) threading a first end of bolt 39 into the threaded hole 37, III) attaching a slip ring 36 to a second end of the bolt 39, whereby the slip ring 36 rotates with the roll 32, IV) connecting a second bolt 38 to bearings within the slip ring 36 and attaching an electrical terminal 34 to the second bolt 38 whereby the terminal 34 remains stationary, and V) connecting the terminal 34 to ground 27.

In one embodiment, the method may comprise the further step of subjecting the reinforced composite to electron beam processing (EBP).

In further refinements of the method, the method may include the further step of placing at least one roll above the plane of the reinforced composite and at least one roll below the plane of the reinforced composite. Also, a further step of connecting bare wires to ground during calender changeover may be used.

In the illustrated embodiment, the method includes the step of subjecting a calendered sheet comprising rubber-coated wire to an electron beam of 2 to 14 mega-RADs.

In the illustrated embodiment, the slip ring 36 is provided as a mercury wetted slip ring.

Also provided is an apparatus 10 for grounding materials on a calender 11 which is used to coat wire reinforcement 12 with rubber 23, wherein the apparatus 10 comprises, a) at least one roll 14,15,19,21 for transporting material through a calender, b) at least one slip ring 36 connected to the roll whereby the slip ring 36 rotates with the roll while a terminal 34 attached to the slip ring stays substantially stationary while the roll rotates, and c) an electrical conductor 26 connecting each of the at least one slip ring 36 to ground 27. The apparatus 10 may further comprise d) an organizer roll 15 for directing wire through the calender 11, the roll having a first end of a conductive rod attached at one end thereof, and e) a slip ring 36 attached to a second end of the conductive rod 39.

In an illustrated embodiment, at least one roll is an organizer roll 15, and the conductive rod is a bolt 39 having a first end threaded into a threaded hole 37 in an end of the organizer roll. Also, a terminal 34 is connected to bolt 38 which is connected to bearings in slip ring 36.

The calender 11 includes apparatus 16 for applying a rubber coat on material passing through the calender 11. The apparatus 10 may include at least one grounding point on the calendered sheet 17 downstream of the calender 11, the at least one grounding point optimally comprising a guide roll 21 for the calendered sheet.

In the preferred embodiment, the apparatus further comprises an electron beam source 28 associated with the calender 11 down stream of a rubber coating apparatus 16 on the calender 11.

DETAILED DESCRIPTION OF THE INVENTION

Figure 1:
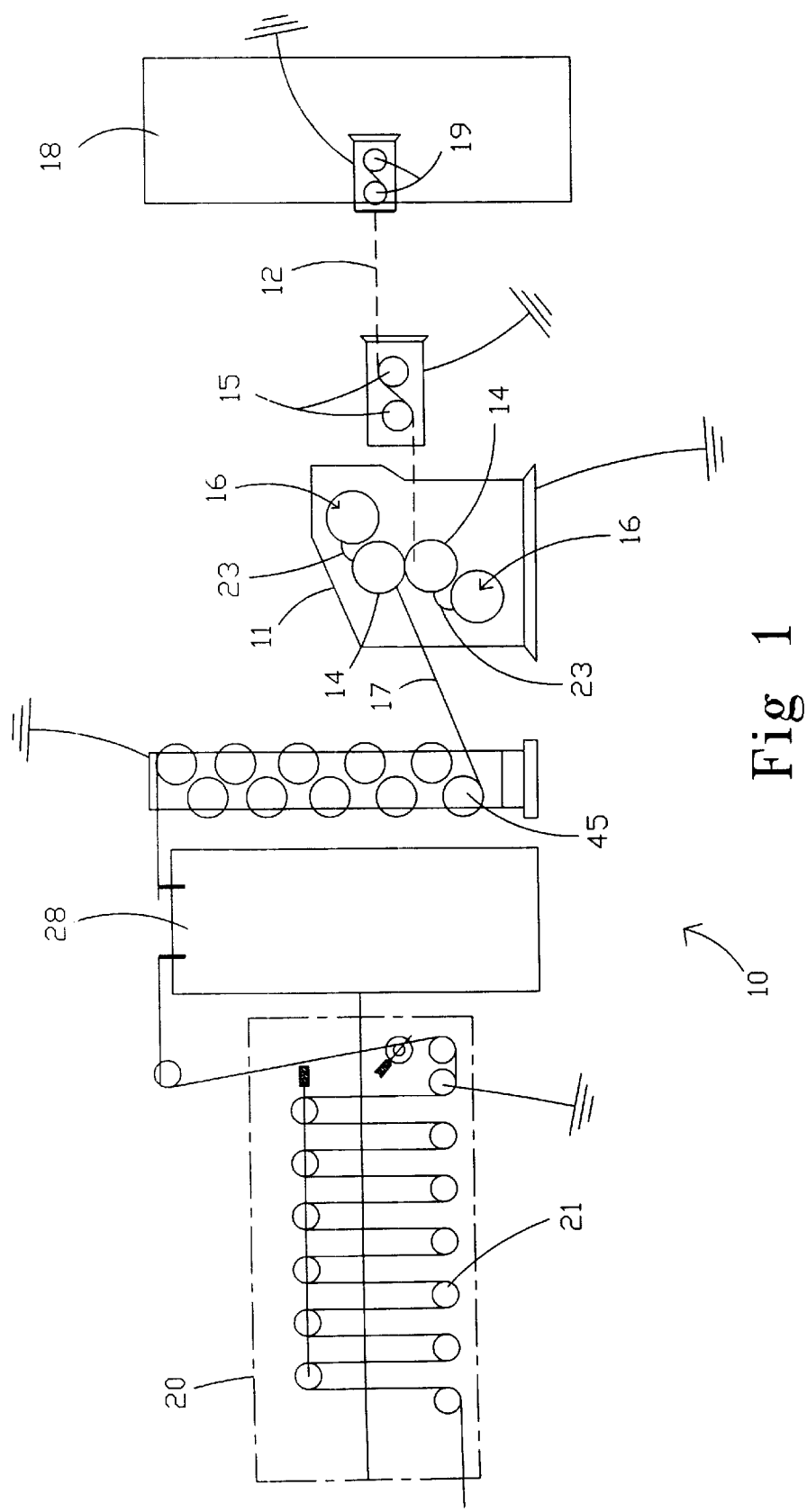
FIG. 1 illustrates the apparatus of the invention, which comprises a calender, a rubber application unit, and an electron beam processor.
Figure 3:
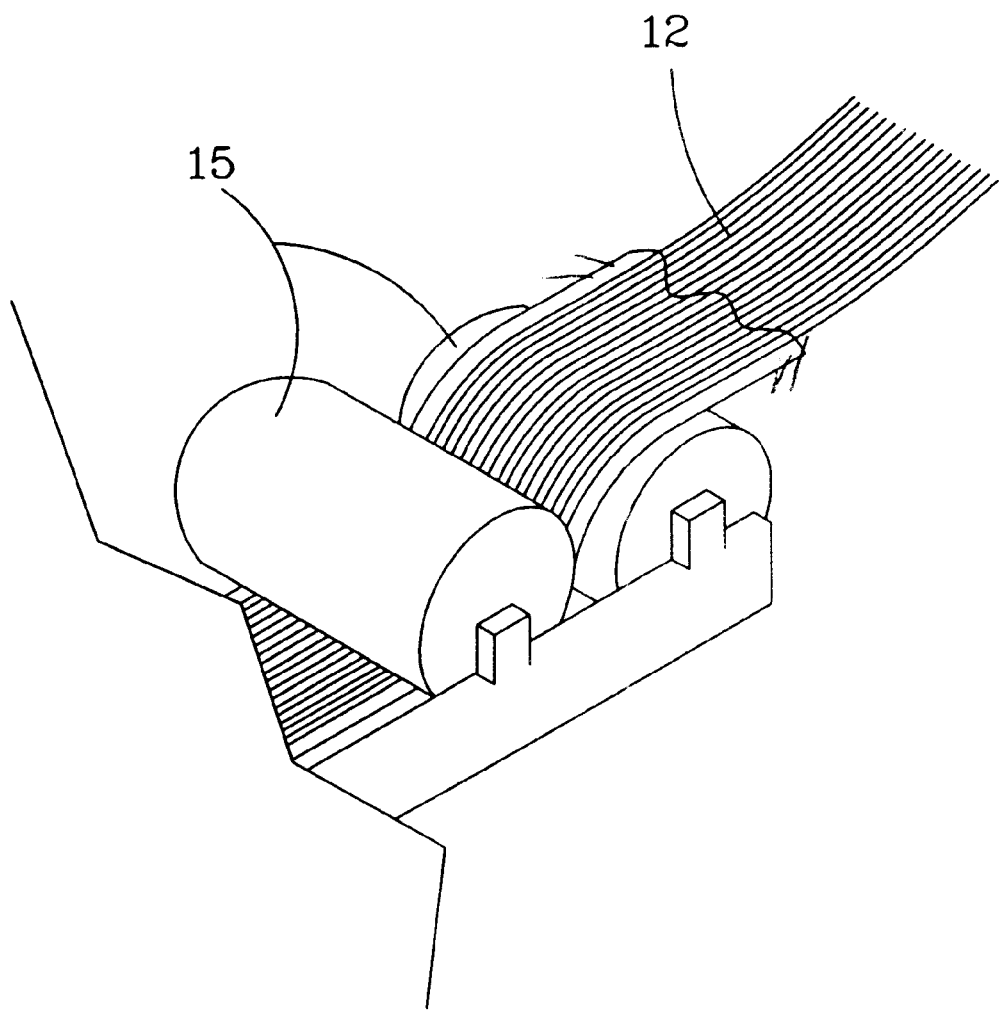
FIG. 3 illustrates a perspective view of organizer rolls, which is part of the embodiment of FIG. 1.

With reference now to FIGS. 1 and 3, the apparatus 10 of the invention comprises a calender 11, a rubber application means 16, and an electron beam-processing unit 28. Those skilled in the art will recognize that when the calender is used for applying rubber to cord reinforcement, a creel 18, may be used to store cord or filament material that is fed into the calender, and a festoon 20 may be used to collect the calendered sheet of composite material.

In the illustrated embodiment of FIG. 1, wires 12 are fed to the calender 11 from a creel 18, and are directed to the calender via organizer rolls 15, and coated with rubber 23 at the calender via impression rolls 14, which are part of rubber application means 16. As the wires 12 pass through the calender 11, rubber 23 is applied to the reinforcement 12 by the action of the calender rolls 14 and continues through the calender line until it is collected upon exiting on festoon 20. The apparatus 10 of the invention includes an electron beam processing unit 28 downstream of the rubber application means 16, which is used to bombard the newly created, green calender material with an electron beam to induce carbon carbon linkage within the polymers of the calendered sheet 17.

Apparatus and methods for applying rubber to cord reinforcement on a calender, and electron beam processors, are well known to those skilled in the art.

The processed calendered material 17 is collected in a roll on a windup (not shown).

Figure 2:
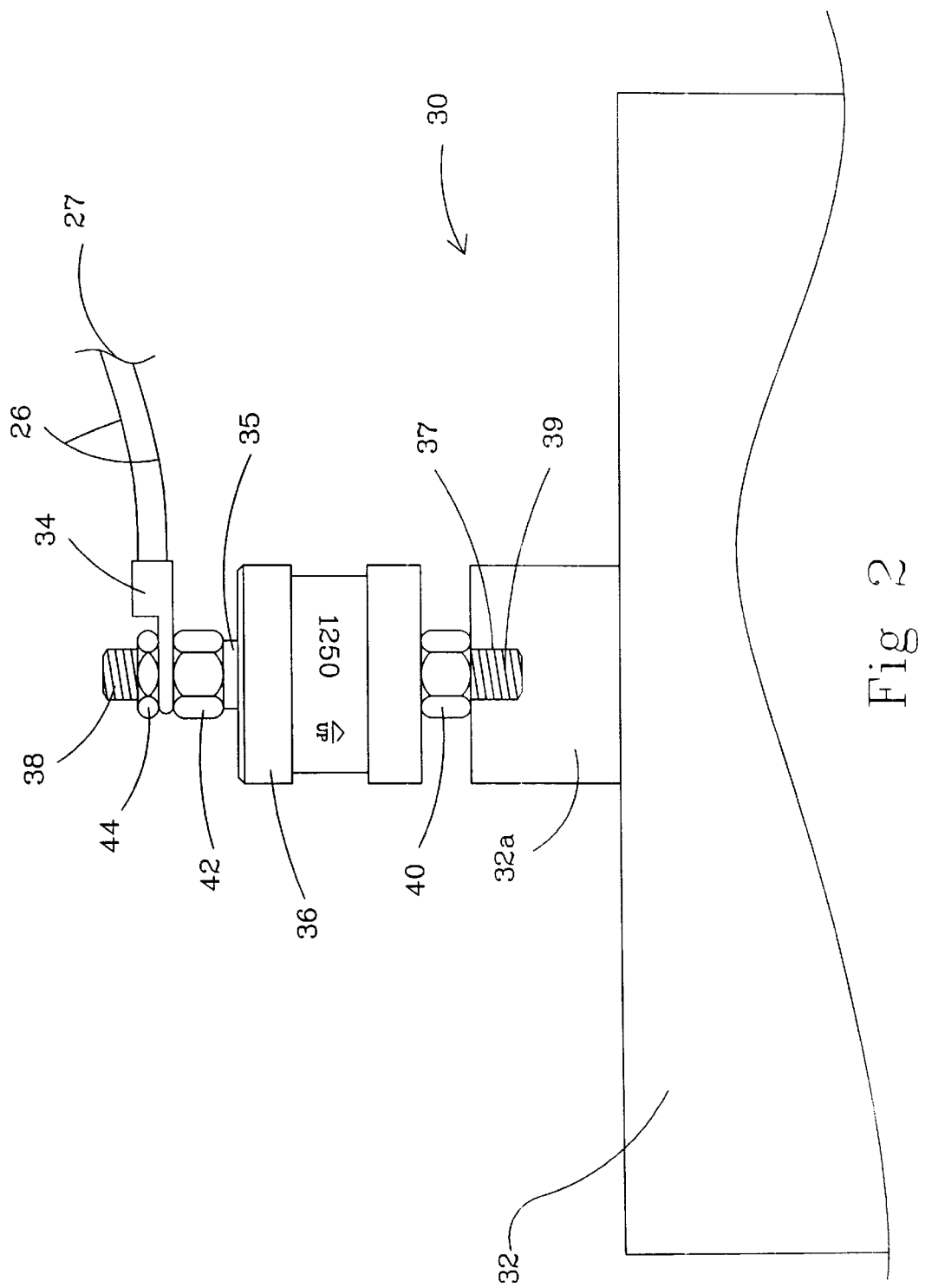
FIG. 2 illustrates the means of grounding potential in the apparatus in one embodiment of the invention.

At least one of impression rolls 14, and at least one of organizer rolls 15 are connected to ground 27 using electrical conductors 26 (FIG. 2).

In the illustrated embodiment, there are four such ground connections on the cord reinforcement 12 prior to when the cord reinforcement enters the calender 11, and there are five such ground connections downstream of the calender, for example on festoon rolls 21, and optionally cooling drums 45, which provide static bleed off from the reinforced sheet product.

It has been found that impression rolls 14, festoon rolls 21, guide rolls 19, and organizer rolls 15, and optionally coolin drums 45 are efficient grounding contacts since they cover the full width of the calendered sheet 17, and the entire surface of the calendered sheet passes over or under the rolls.

Although the grounding system developed for the present apparatus was intended to reduce the induced potential created by electron beam processing, it has been found that the grounding system also effectively eliminates static buildup on calendered sheets that do not contain wire reinforcement.

With reference now to FIG. 2, in the illustrated embodiment, connection to ground is obtained by attaching a slip ring 36 to the end of each of the roll where a ground connection is made, wherein the bearings in slip ring 36 permit the slip ring 36 to rotate with a roll 32 while isolator 35 permits terminal 34 to remain stationary.

The slip ring 36 may be attached to a roll 19, 15, 14, 21 by any convenient mechanical means, for example a rod welded to the end of a roll shaft 32a.

In the embodiment illustrated in FIG. 2, wire 12 passes over roll 32, which has a drilled and tapped hole 37 in one end thereof. As used herein, roll 32 represents generically any of the rolls associated with the calender which may be connected to ground.

In the illustrated embodiment, a bolt 39 is threaded into drilled and tapped hole 37 and held tightly in place by nut 40. Slip ring 36 is carried on bolt 39, and rotates as roll 32 rotates. Bolt 38 is connected to bearings (not shown) in slip ring 36, whereby the rotation of slip ring 36 is isolated from bolt 38. Therefore, bolt 38 remains stationary while slip ring 36 and roll 32 rotate. In the illustrated embodiment, terminal 34 is held on bolt 38 by nuts 42 and 44. Terminal 34 is connected to electrical conductors 26, which are connected to the factory ground 27.

Terminal 34 fits over bolt 38, and when attached to bolt 38 may make electrical contact with the slip ring assembly directly through bolt 38, or indirectly through nuts 42 and 44.

In the method of the invention, using the apparatus 10 described herein, a reinforced composite 17 is formed on a calender 11 comprising the steps of a) grounding guide rolls 15,19 which are used to feed the reinforcement 12 to a calender 11, b) coating the reinforcement 12 with rubber 23 while on the calender 11 to form a reinforced composite 17, and c) grounding rolls 21, 45 which contact the reinforced composite 17 after the composite exits the calender 11.

In the illustrated embodiment, the method further comprises attaching slip rings 36 to rolls 14 that contact the reinforcement 12 and the composite 17 on the calender 11, and connecting the slip ring 36 to ground 27.

In the method, step a) may further comprise grounding reinforcement 12 by 1) drilling and tapping the end of a roller 32 or shaft 32a to provide a threaded hole 37 for receipt of a bolt 39, 2) threading a first end of a bolt 39 into the threaded hole 27, 3) attaching a slip ring 36 to a second end of the bolt 39, and 4) connecting the slip ring 36 to ground 27.

In the illustrate embodiment, the method further comprises the step of subjecting the reinforced composite 17 to electron beam processing.

In further embodiments of the method, at least one roll is provided above the plane of the reinforced composite, and at least one roll is provided below the plane of the reinforced composite.

In the method step wherein electron beam processing is used, the electron beam may comprise a beam of 2 to 14 mega-RADs.

In a preferred embodiment, the slip rings 36 are mercury wetted slip rings.

As an added safety feature, it is proposed to run a certain amount of bare reinforcement through the calender 11 so that ground can be established with bare wires at both ends of the calender 11 before the rubber application step is begun. In addition, an additional section of uncalendered reinforcement can be run through the calender after rubber application and electron beam processing is completed, to assure that the reinforcement in the calendered sheet 17 is grounded at all times.

The invention is further illustrated with reference to the following example.

EXAMPLE

In this example, the method and apparatus of the invention are used to treat a wire-reinforced product with electron beam processing (EBP).

The calender was modified to provide nine ground points throughout the line. Four grounding points were established on roll, which contact the wire reinforcement before the wire reaches the calender. Five additional grounding points were established downstream on the calender, and after the calender, as an added safety factor, and to reduce static buildup on the calendered sheet and to ground the bare cords during calender changeover.

Prior to energizing the EBP unit, all connections were carefully checked, and it was verified that when steel cord was in contact with the grounded rollers, they also were at ground potential.

While the calender was running, and the electron beam-processing unit was in operation, attempts were made to measure any induced voltages in the wire cord. No voltages were observed on AC and DC settings on the voltmeter. The lack of induced voltages was further confirmed by static meter readings throughout the line, whereby negligible readings were observed. These tests were carried out using normal dosages of electron beams.

The test was repeated by doubting the output of the electron beam processor, and the same results were achieved.

While the invention has been specifically illustrated and described, those skilled in art will recognize that the invention may be variously modified and practiced without departing form the spirit of the invention. The scope of the invention is limited only by the following claims.

What is claimed is:

1. A method of forming a reinforced composite on a calender (11) comprising the steps of:
    a) providing a creel with first rolls (15,19) and a calender with second rolls (21,45);
    b) grounding the first and second rolls (15,19, 21,45) by attaching a slip ring (36) to said first and second rolls whereby said slip rings (36) rotate with said first and second rolls, and connecting a bolt (38) to said slip rings (36) and attaching an electrical terminal (34) to said bolts (38) whereby said terminals (34) remain stationary;
    c) feeding a reinforcement (12) from the first rolls to the second rolls; and
    d) coating said reinforcement (12) with rubber (23) while in the calendar (11) to form the reinforced composite (17).

2. The method of claim 1 wherein the steps (a) and (b) further comprise connecting the slip rings (36) to a ground (27).

3. The method of claim 1 wherein the rolls rotate on a roll shaft and the step (a) further comprises steps of
    drilling and tapping an end of the roll shafts (32a) to provide threaded holes (37) for receipt of first bolts (39),
    threading a first end of the first bolts (39) into said threaded holes (37);
    attaching the slip rings (36) to the rolls using the first bolts (39) whereby said slip rings (36) rotate with said first rolls; and
    connecting said terminal (34) to a ground (27).

4. The method of claim 1 further comprising subjecting the reinforced composite (17) to an electron beam processing (EBP).

5. The method of claim 4 wherein the step of subjecting the reinforced composite (17) comprises irradiating the reinforced composite to an electron beam intensity of 12 to 14 mega-RADS.

6. The method of claim 1 further comprising placing at least one of the rolls above a plane of the reinforced composite (17) and at least one of the rolls below the plane of the reinforced composite (17).

* * * * *